United States Patent [19]
Garrido

[11] Patent Number: 5,918,846
[45] Date of Patent: Jul. 6, 1999

[54] SEAT TRACK WITH CONTINUOUS ENGAGEMENT AND MEMORY EASY ENTRY MECHANISM

[75] Inventor: Pascal Garrido, Gravehurst, Canada

[73] Assignee: Meritor Automotive Canada, Inc., Canada

[21] Appl. No.: 08/762,010

[22] Filed: Dec. 11, 1996

[51] Int. Cl.⁶ ........................................... F16M 13/00
[52] U.S. Cl. ................................. 248/429; 248/424
[58] Field of Search ................................ 248/424, 429

[56] References Cited

U.S. PATENT DOCUMENTS

| | | | |
|---|---|---|---|
| 4,781,354 | 11/1988 | Nihei et al. | 248/424 X |
| 4,909,469 | 3/1990 | Nihei et al. | 248/429 |
| 5,100,092 | 3/1992 | Sovis | 248/429 |
| 5,234,189 | 8/1993 | Myers | 248/429 |
| 5,286,076 | 2/1994 | DeVoss et al. | 248/429 X |
| 5,520,362 | 5/1996 | Gerlach | 248/429 |
| 5,596,910 | 1/1997 | Bauer et al. | 248/408 X |

FOREIGN PATENT DOCUMENTS

| | | |
|---|---|---|
| 0683066A1 | 5/1995 | European Pat. Off. . |
| 2233915 | 1/1973 | Germany . |
| 2286522 | 2/1994 | United Kingdom . |

Primary Examiner—Peter R. Brown
Assistant Examiner—Stephen Vu

[57] ABSTRACT

A vehicle seat mounting assembly includes a locking device mounted on an upper track that moves relative to a lower track. The mounting device includes a plurality of locking pawls that engage one or more slots on the lower track so that the upper track, and the seat, are maintained in a fixed position relative to the lower track. The locking device includes a first release bracket for disengaging the locking device and adjusting the position of the seat. Activation of the first release bracket causes simultaneous movement of a seat position indicator. The seat position indicator remains stationary relative to the lower track in the event that a second release bracket is used to disengage the locking device. When the second release bracket is used, the position indicator serves to provide for automatic repositioning of the seat into its last position before activation of the second release lever. The locking device further includes a plurality of locking pawls that are dimensioned and spaced in a preselected order corresponding to dimensions and spacings of slots in the lower track so that at least one of the locking pawls engages at least one slot in the lower track at all times that the locking device is in a locking position.

16 Claims, 6 Drawing Sheets

SEAT TRACK WITH CONTINUOUS ENGAGEMENT AND MEMORY EASY ENTRY MECHANISM

BACKGROUND OF THE INVENTION

This invention relates generally to an assembly for mounting a seat within a vehicle. More particularly, this invention relates to a seat mounting assembly including a memory block for indicating a previous position of the seat under certain circumstances.

Seat track arrangements for mounting seats within vehicles are generally well known. Most arrangements provide for a seat to be moved or adjusted in forward and rearward directions within a vehicle.

In many circumstances, it is desirable to have seats within a vehicle that include a seatback portion that is pivotally supported to be folded forward and downward relative to the base of the seat. Such an arrangement is necessary, for example, in two-door vehicles so that a passenger can have access into and out of the rear seat of the vehicle. It is also desirable that a front seat in a two-door vehicle slide forward to allow easier access to the rear seat of the vehicle. One disadvantage to providing such an arrangement, however, is that it may require repeated, bothersome adjustments to return the front seat to its original position after the desired access to the rear seat is completed.

Accordingly, it is desirable to provide a seat mounting assembly that permits easy access to a rear seat of the vehicle and facilitates automatically returning the front seat to its original position. Another matter of general concern in seat track assemblies is to provide a secure placement of the seat for safety reasons.

SUMMARY OF THE INVENTION

In general terms, this invention is a vehicle seat assembly including a seat base portion. A seatback portion is pivotally supported for pivotal movement relative to the base portion. A first track has a side wall including a plurality of spaced slots through the side wall. A second track is supported for movement relative to the first track. The base portion is supported on the second track for movement with the second track. A locking device is supported on the second track for movement into and out of a locking position. When the locking device is in the locking position, the second track remains stationary relative to the first track. Because the first track is fixedly mounted to the vehicle frame, the seat remains stationary in the vehicle when the locking device is in the locking position.

A first release member is operatively coupled to the seatback portion and movably supported on the second track for movement responsive to movement of the seatback portion. The first release member is movable into a disengaged position where the first release member moves the locking device out of the locking position such that the second track, and therefore the seat, are free to move relative to the first track. A seat position indicator engages a portion of the first track when the seat is in a stationary position. Operation of the first release member has no effect on the seat position indicator. Therefore, after the seat has been moved, in a forward direction for example, and then returned toward the original position, the seat position indicator provides an automatic placement of the seat into its previous position.

A second release member is movably supported on the second track for movement into a disengaged position where the second release member moves the locking device out of the locking position. A handle is operatively coupled to the second release member and is movable to move the second release member into the disengaged position. Movement of the handle and the second release member disengages the seat position indicator from the first track. This allows a seat occupant to place the seat in a new preferred position. Once the seat is properly positioned, the seat position indicator re-engages the first track and, therefore, provides an indication of the new preferred seat position.

The other features and advantages of this invention will become apparent to those skilled in the art from the following detailed description of the preferred embodiment. The drawings that accompany the preferred embodiment can be described as follows.

DETAILED DESCRIPTION OF THE PREFERRED EMBODIMENT

Figure 1:
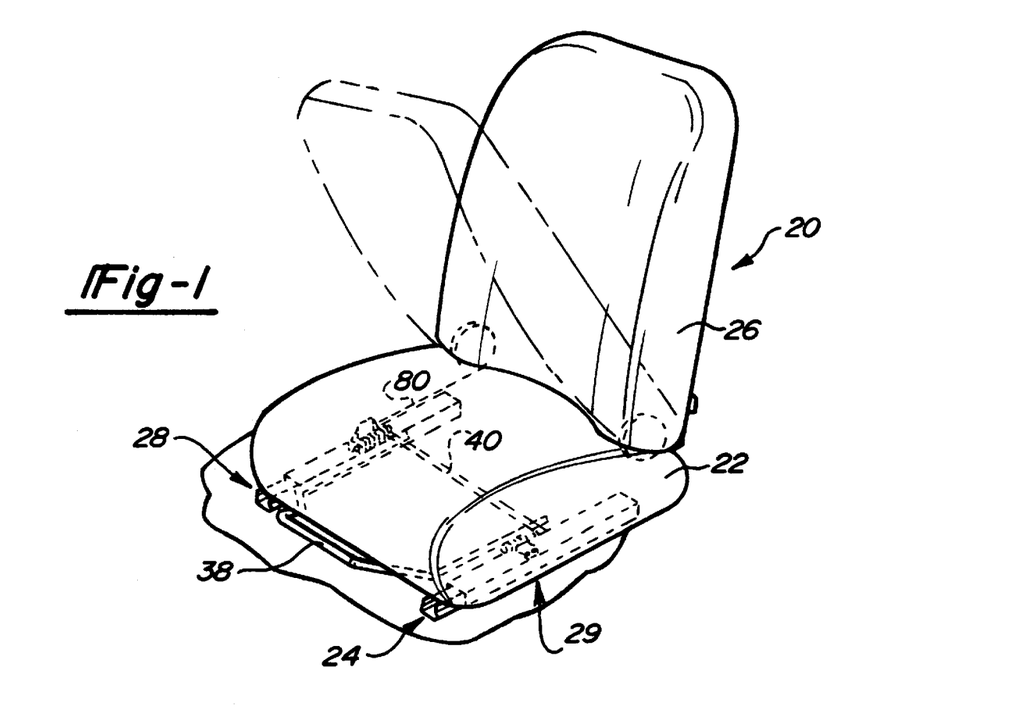
FIG. 1 is a diagrammatic, perspective illustration of a seat with a seat track mounting assembly signed according to this invention.

FIG. 1 diagrammatically illustrates a vehicle seat assembly 20. The seat assembly includes a seat base portion 22 that is mounted within the vehicle on a mounting assembly 24. A seatback portion 26 is pivotally supported for pivotal movement relative to the seat base portion 22 as indicated in phantom in FIG. 1.

Figure 2:
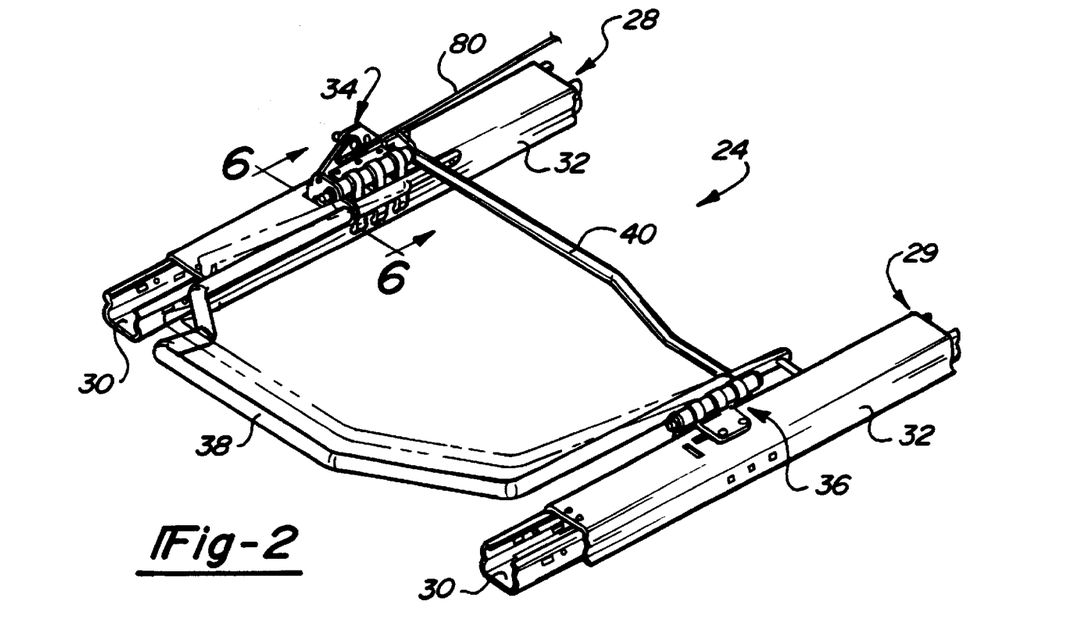
FIG. 2 is a perspective view of a preferred embodiment of a seat track assembly designed according to this invention.

FIG. 2 illustrates the mounting assembly 24, which includes track assemblies on an inboard side 28 and an outboard side 29 of the seat assembly. The terms inboard and outboard are used in this specification for clarity and illustration purposes only and cannot be considered limiting.

Each side of the mounting assembly 24 includes a lower track 30 that is fixedly mounted to the frame of the vehicle, for example. An upper track 32 is received over the lower track 30 so that the upper track 32 can be moved in a forward or rearward direction relative to the lower track 30. The terms forward and rearward, as used in this specification, are for illustration purposes only and cannot be considered limiting. The profiles of the lower track 30 and the upper track 32 ensure that the upper track 32 only moves along a longitudinal axis of the tracks and does not move in other directions.

The inboard side of the mounting assembly 24 includes a locking device 34 that is supported on the upper track 32. The outboard side includes a locking device 36 that is supported on the upper track 32 on the outboard side 29. The inboard side of the assembly 24 is shown in an exploded, perspective view in FIG. 3. The outboard side 29 of the assembly 24 is shown in an exploded, perspective view in FIG. 4.

A handle 38 is accessible by a seat occupant from the front of the seat 20 to disengage the locking devices 34 and 36 so that the position of the seat can be adjusted. The handle 38 only acts directly upon the locking device 34 and a connector bar 40 is provided so that the locking device 36 is also actuated upon manipulation of the handle 38, as will be described in more detail below.

Figure 3:
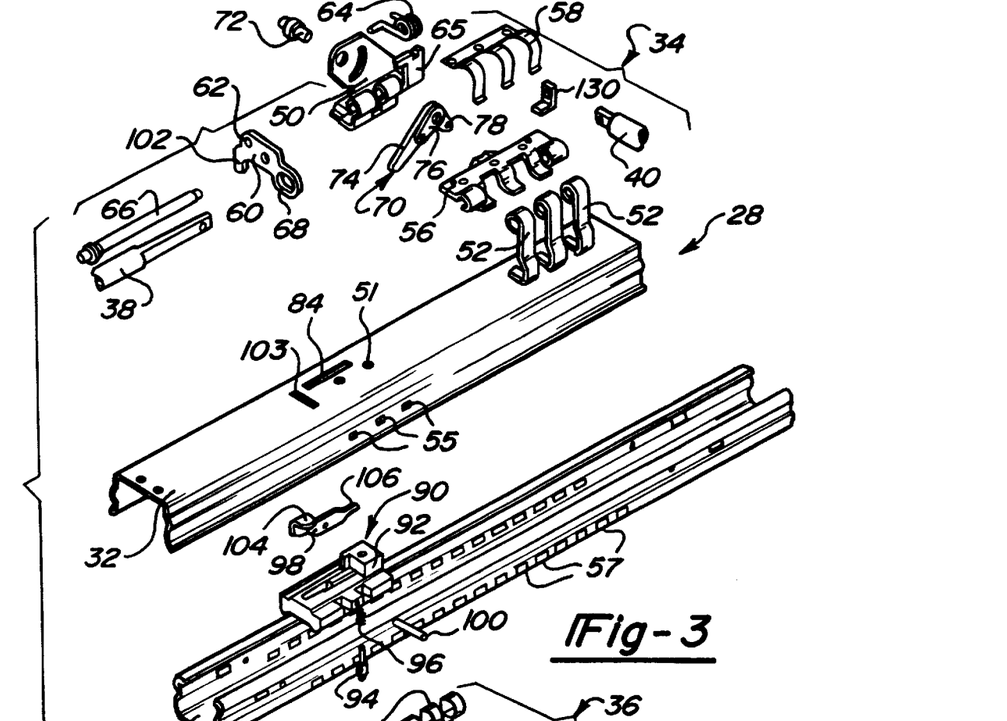
FIG. 3 is a perspective, exploded view of selected portions of the embodiment of FIG. 2.
Figure 4:
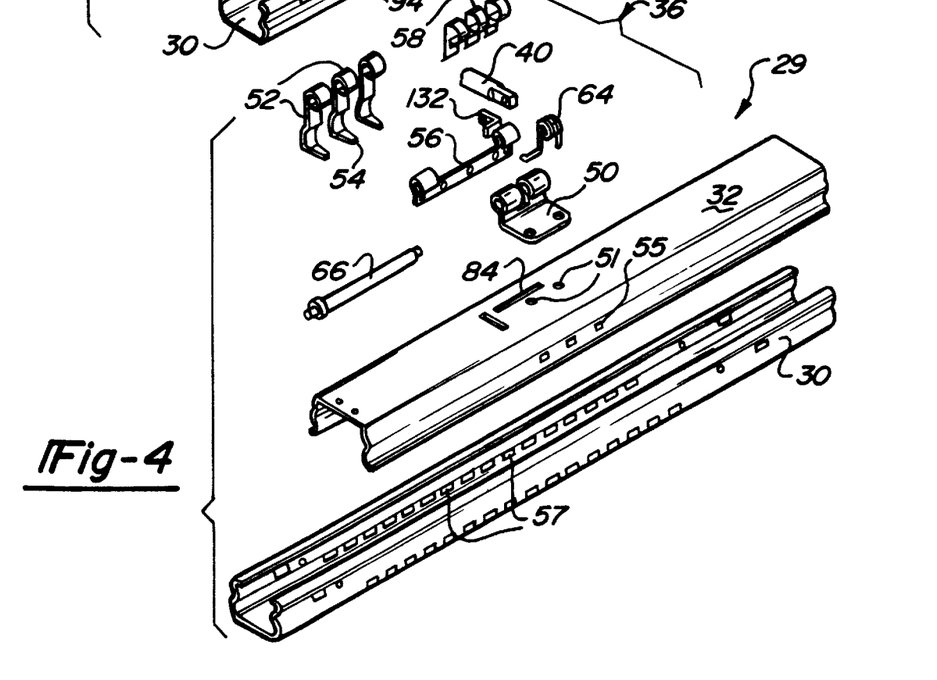
FIG. 4 is a perspective, exploded view of selected portions of the embodiment of FIG. 2.
Figure 5:
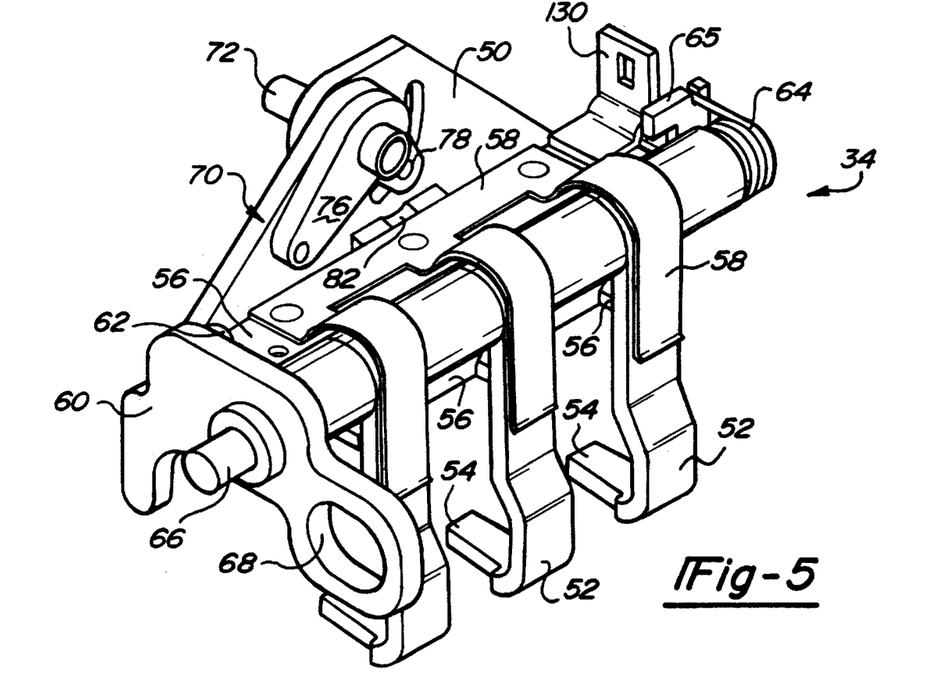
FIG. 5 perspective illustration of a preferred embodiment of a locking device designed according to this invention.

Referring now to FIGS. 3–5, the locking device 34 includes a mounting bracket 50. The mounting bracket 50 is secured to the upper track 32 through a set of mounting holes 51. A conventional rivet or other fastener can be used to secure the mounting bracket 50 to the upper track 32. A plurality of locking pawls 52 include tab portions 54 that are positioned and sized to be received through a corresponding plurality of slots 55 in the upper track 32. A lock release bracket 56 acts upon the locking pawls 52 to move the tab portions 54 out of engagement with a plurality of slots 57 in the lower track 30. When at least one of the tabs 54 on a locking pawl 52 extends through an appropriate slot 55 on the upper track 32 and one of the slots 57 on the lower track 30, the upper track 32 is maintained in position relative to the lower track 30. A spring member 58 is supported on the lock release bracket 56 for biasing the locking pawls 52 into a position to be received within the slots 57.

Figure 6:
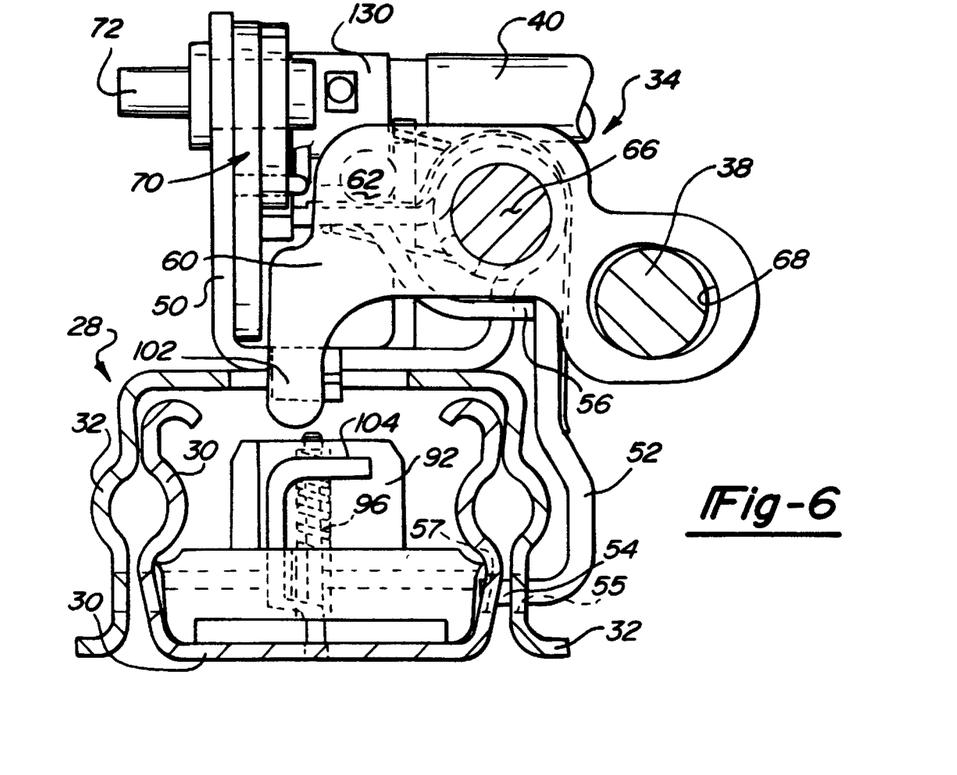
FIG. 6 is a partial cross-sectional view taken along the lines 6—6 from FIG. 2.

A first release bracket 60 includes a tab member 62 that extends away from a generally planar surface on the first release bracket 60. The bracket 60 is biased into the position shown in FIGS. 5 and 6, for example, by a coil spring 64. One end of the coil spring 64 is operatively coupled with a spring mount 65 on the mounting bracket 50. The tension in the spring 64 biases a pin 66 and, therefore, the bracket 60 in a clockwise direction (according to FIG. 5). The spring 64 also biases the lock release bracket 56, pawls 52, and the spring member 58 in the same direction.

The first release bracket 60 includes an oblong ring portion 68 that includes an opening for receiving the handlebar 38. As the handlebar 38 is manipulated by a seat occupant, for example, the first release bracket 60 is rotated about the pin 66 in a counter-clockwise direction (according to FIGS. 5 and 6, for example). As the first release bracket 60 rotates, the pin 62 engages the lock release bracket 56 and forces the latter to rotate, also. Such rotation of the first release bracket 60 and the lock release bracket 56 causes the pawls 52 to move into an unlocked position. Such an unlocked position is shown, for example, in FIG. 7.

Figure 7:
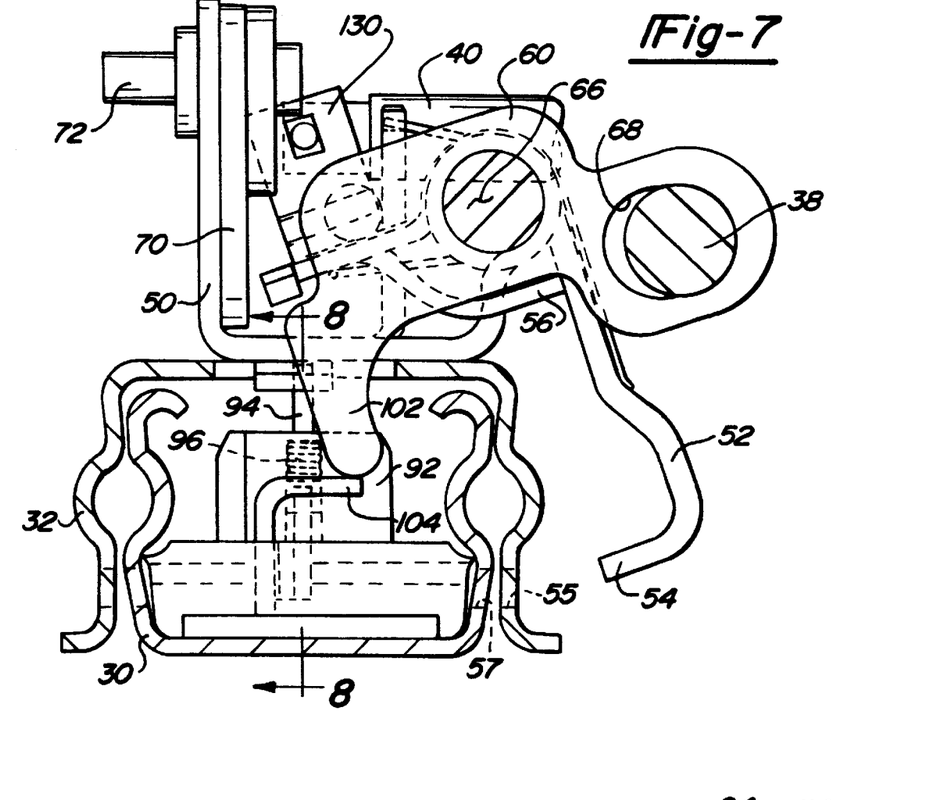
FIG. 7 illustrates the embodiment of FIG. 6 where the locking device is moved into an unlocked position.

When the locking pawls 52 are moved in a direction such that the tab portions 54 no longer engage any of the slots 57 in the lower track 30, the upper track 32 and, therefore, the seat can be moved in a forward or rearward direction relative to the lower track 30. Once the handlebar 38 is released, the bias of the spring member 58 and the coil spring 64 urge the locking pawls 52 back into a locked position where at least one of the tabbed portions 54 is received through at least one of the slots 57 in the lower track 30. Accordingly, the operative connection between the handlebar 38 and the first release bracket 60 provide one way for a seat occupant to disengage the locking pawls of the locking device so that the seat position may be adjusted.

A system designed according to this invention includes a second arrangement for disengaging the locking device 34. A second release bracket 70 is pivotally supported on the mounting bracket 50 by a mounting pin 72. The second release bracket 70 includes a trigger portion 74 and a retaining portion 76. A connector arm 78 is also part of the second release bracket 70. The connector arm 78 provides a connection point for a linkage cable 80, which is coupled at an opposite end to the seatback portion 26. Movement of the seatback portion 26 into the folded or forward position illustrated in phantom in FIG. 1, for example, causes the linkage cable 80 to pull on the connector arm portion 78, which causes the second release bracket 70 to rotate in a generally counter-clockwise direction (according to the drawings) about the pin 72.

Figure 9:
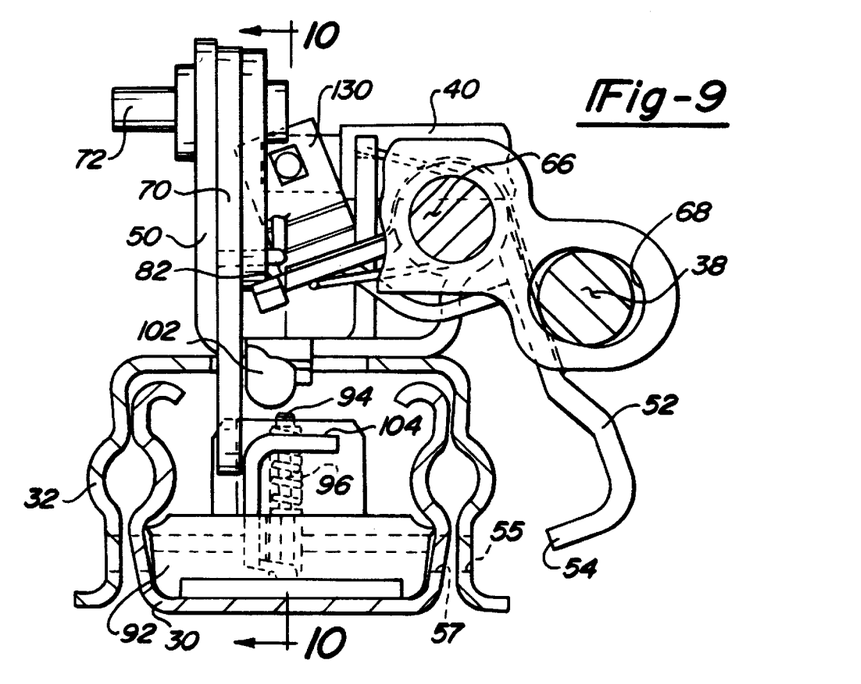
FIG. 9 illustrates the embodiment of FIG. 6 in a position where the locking device is unlocked position.
Figure 10:
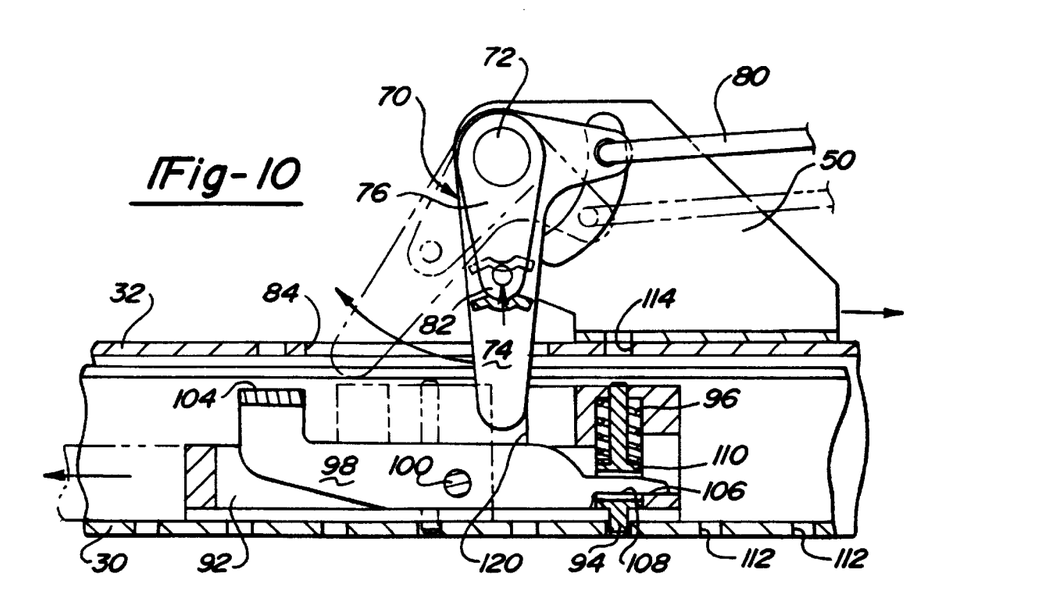
FIG. 10 is a partial cross-sectional view illustrating a preferred operation of a position designed according to this invention.

As best seen in FIGS. 9 and 10, counter-clockwise rotation of the second release bracket 70 disengages the locking device 34 from a locked position. As the second release bracket 70 rotates in a counter-clockwise direction, the elongated trigger portion 74 moves through a slot 84 in the upper track 32. The retaining portion 76 engages a receiving indent 82 on the lock release bracket 56. The retaining portion 76, therefore, moves the lock release bracket 56 and the locking pawls 52 against the bias of the coil spring 64. The connection between the spring member 58 and the lock release bracket 56 preferably causes the spring member 58 to rotate with the lock release bracket 56 so that the movement of the second release bracket 70 does not have to act against the bias of the spring member 58. As can be seen in FIG. 9, the locking device 34 can be unlocked through use of the second release bracket 70 without causing movement of the first release bracket 60. The independent movement of the first release bracket 60 and the second release bracket 70 provides advantages that will be described below.

Referring back to FIG. 3, a position indicator 90 provides a significant advantage in a system designed according to this invention. A raised block portion 92 includes a bore that slidably receives a pin 94. A spring 96 biases the pin 94 toward the lower track 30. A lever 98 is supported on the position indicator 90. The lever 98 pivots about a mounting pin 100 that is appropriately received in a portion of the position indicator 90.

Figure 8:
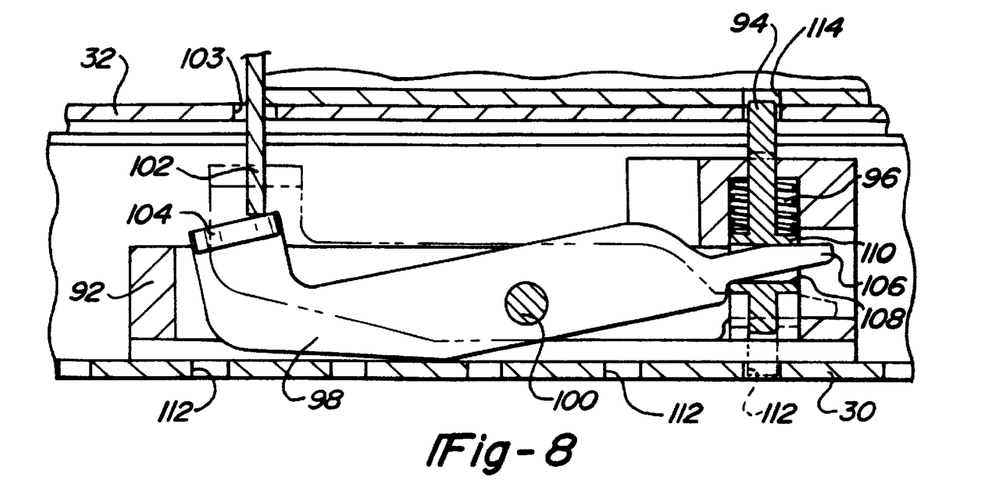
FIG. 8 is a partial cross-sectional view showing a preferred operation of a seat position indicator designed according to this invention.

Referring now to FIGS. 7 and 8, the interaction between the lever 98 and the first release bracket 60 is illustrated. As the handlebar 38 is manipulated, causing the first release bracket 60 to rotate about the pin 66, an extension tab portion 102 on the release bracket 60 engages a lever surface 104 on the lever 98. The tab portion 102 extends through a slot 103 in the upper track 32. Since the lever 98 is pivotally mounted in the position indicator 90, movement of the lever surface 104 as caused by the tab portion 102, causes a corresponding movement in an opposite direction of a lever extension 106.

The lever extension 106 extends through an opening 108 in a generally cylindrical sleeve portion 110 on the pin 94.

As best seen in FIGS. 8 and 10, the spring 96 is biased against a first surface within the block portion 92 and an outer surface on the sleeve portion 110. As the first release bracket is rotated by movement of the handlebar 38, the tab portion 102 moves through the slot 103 and engages the lever surface 104. Such movement causes pivotal motion about the pin 100 such that the lever extension 106 urges the pin 94 against the bias of the spring 96. This movement disengages a first end of the pin 94 from a slot 112 on the lower track 30. The lower track 30 includes a plurality of spaced slots 112 along a substantial portion of the track 30. Engagement between the pin 94 and a slot 112 keeps the position indicator 90 in a fixed position relative to the lower track 30.

When the handlebar 38 is manipulated to move the first release bracket 60, the tab portion 102 engages the lever surface 104 as illustrated. Movement of the pin 94 causes a second end of the pin to move into a position to engage an index bore 114 on the upper track 32. When this is accomplished, the position indicator 90 is indexed to and moves with the upper track 32 relative to the lower track 30. Accordingly, when a seat occupant desires to adjust the seat position by manipulating the handle 38, the position indicator 90 is moved with the seat. Once the handle 38 is released, the bias of the spring 96 moves the pin 94 back into engagement with one of the slots 112 on the lower track 30. At that point, the position indicator 90 is indexed to the lower track 30.

In many circumstances, it is desirable to move the seat 20 from a current position and, shortly thereafter, return it to that same position. This is especially true in two-door vehicles where a front seat must be moved or adjusted in some manner to allow access to the rear seat of the vehicle. In a system designed according to this invention, a seatback portion 26 preferably is moved forward and downward (as illustrated in phantom in FIG. 1, for example) and the entire seat, including the base portion 22 is then moved forward within the vehicle. The position indicator 90 provides the significant advantage that after the seat has been moved as just described, it is readily returned to its initial position.

As best illustrated in FIGS. 9 and 10, movement of the seatback portion causes the second release bracket 70 to engage the lock release bracket 56 and unlock the locking device 34. Because the second release bracket 70 is independent of the first release bracket 60, the tab portion 102 does not engage the lever surface 104. This is illustrated, for example, in FIG. 9. Accordingly, the position indicator 90 remains fixed in an indexed position on the lower track 30. The locking device 34, however, has been disengaged and the seat 20 can be moved forward because the upper track 32 is free to move relative to the lower track 30.

Assuming that the seat 20 has been moved as desired, it is then moved back toward its initial position. As the upper track 32 slides in a rearward direction (i.e., to the right in FIG. 10) relative to the lower track 30, the trigger portion 74 on the second release bracket 70 engages the raised block portion 92 on the position indicator 90. Further movement of the upper track 32 relative to the lower track 30 results in the raised block portion 92 forcing the trigger portion 74 in a generally clockwise direction, which results in the retaining portion 76 becoming disengaged from the receiving indent 82. At that moment, the spring 64 biases the lock release bracket 56 back toward a position where the spring member 58 biases the locking pawls into a locked or engaged position. Accordingly, the position indicator 90 causes the locking device 34 to return to a locked position once the seat 20 is returned to its initial position.

As will be understood by those skilled in the art, when the second release bracket 70 is activated, the seat 20 is free to move in only one direction from the current position. It is then free to move back in an opposite direction toward the initial position so that the position indicator 90 causes the locking device 34 to re-lock when the seat 20 is returned to its initial position. On the other hand, the handle 38 and the first release bracket 60 cause the position indicator 90 to move with the seat when the seat occupant uses the handle 38 as described above.

Figure 11:
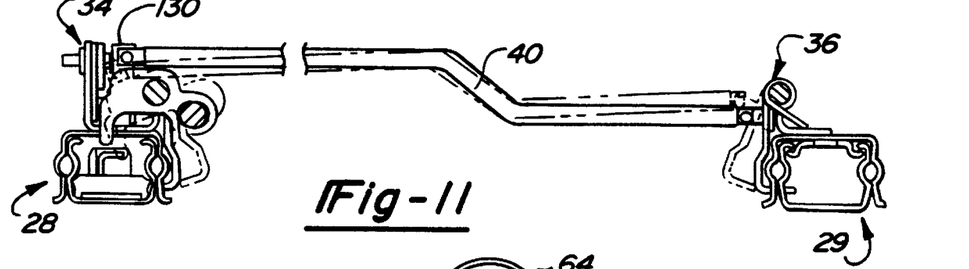
FIG. 11 is a front elevational view of the embodiment of FIG. 2.
Figure 12:
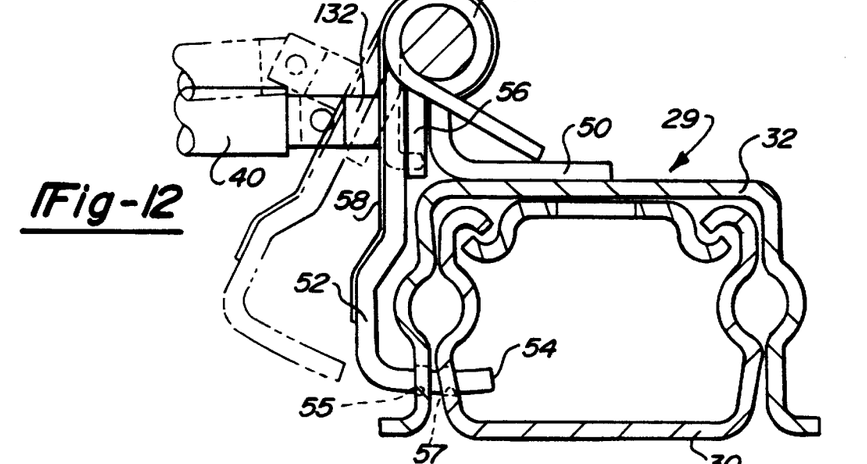
FIG. 12 a partial cross-sectional view illustrating an outboard side of the embodiment of FIG. 2.

The preceding description has focused on the locking device 34. The locking device 36 works in essentially the same manner. Each time that the locking device 34 is moved into an unlocked position, whether by actuation of the first release bracket 60 or the second release bracket 70, the locking device 36 is also unlocked. As best seen in FIGS. 11 and 12, the connector bar 40 extends between a bar mount 130 on the mounting bracket 50 and a bar mount 132 on the mounting bracket of the locking device 36. Pivotal connections are provided at the bar mounts 130 and 132 so that the pivotal movement of the lock release bracket 56 on the locking device 34 is followed by pivotal movement of the lock release bracket 56 on the locking device 36. As seen in FIGS. 3 and 4, the lock release brackets 56 and the mounting brackets 50 preferably are slightly different between the two locking devices. The operation of them is identical. It is important to note that there is no need for the first release bracket 60 or the second release bracket 70 on the outboard side 29 of the assembly 24 because there is no position indicator member provided on the outboard side of the assembly.

Figure 13:
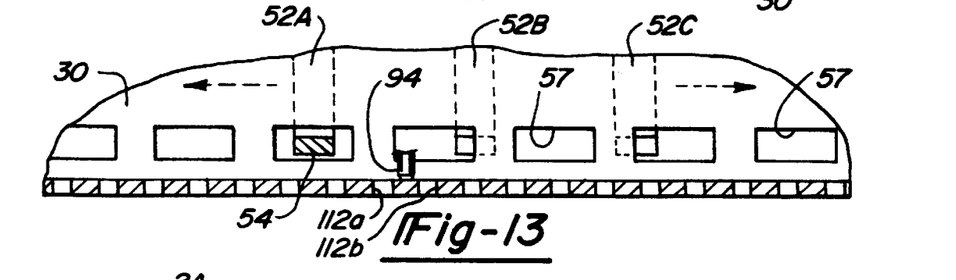
FIG. 13 is a cross-sectional illustration of a preferred interaction between the locking device seat track of this invention.
Figure 14:
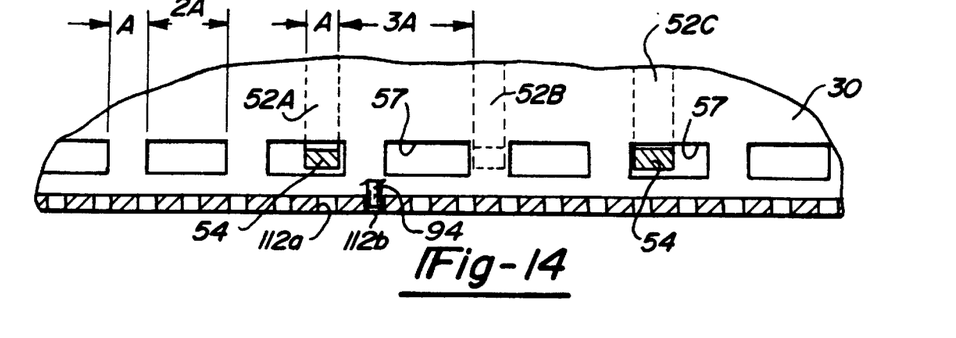
FIG. 14 illustrates the embodiment of FIG. 13 in another position.

An important feature of a system designed according to this invention is that one of the locking pawls 52 engages one of the slots 57 on the lower track 30 whenever the locking device is in a locking position. FIGS. 13 and 14 illustrate this feature. Assume that the handlebar 38 has been manipulated to adjust the position of the seat 20. Once the handlebar 38 is released, the springs 64 and 58 urge the locking pawls 52 into an engaged or locked position. FIG. 13 illustrates a first locking pawl 52a received within one of the slots 57 on the lower track 30. The locking pawls 52b and 52c, however, are not engaged in one of the slots 57. The pin 94 is not yet received within a slot 112 in the bottom of the lower track 30. Slight movement of the seat 20 in either direction will result in either the locking pawl 52b or 52c being received within a corresponding slot on the lower track 30. At the same time, the pin 94 will be received in either 112a or 112b.

FIG. 14 illustrates the embodiment of FIG. 13 after the seat has been moved slightly to the right (according to the drawings). In FIG. 14, the locking pawl 52a engages one slot 57 while the locking pawl 52c engages another slot 57. The locking pawl 52b is not engaged. The pin 94 is now received in the slot 112b and, therefore, the position indicator 90 is indexed to the lower track 30. When the locking device 34 is in the orientation illustrated in FIG. 14, the seat 20 is securely positioned within the vehicle. The locking pawl 52c prevents the seat from moving to the left while the locking pawl 52a prevents the seat from moving to the right (according to the drawings).

The locking pawls 52 preferably are dimensioned and spaced in a specific arrangement. Similarly, the slots 57 on the lower track 30 preferably have a specific size and orientation. The tab portions 54 on the locking pawls 52 preferably have an operative dimension or width A. The slots 57 preferably have an opening with an operative dimension of 2A. Spacing between the locking pawls 52 preferably is equal to 3A. The spacing between the openings of the slots 57 preferably is A.

The ratios between the size of the tab portions 54, the size of the slots 57, and the spacing between them provides a significant advantage. Whenever the locking device is not disengaged by operation of the first release bracket 60 or the second release bracket 70, at least one of the locking pawls 52 engages one of the slots 57 on the lower track 30. This is illustrated, for example, in FIG. 13. Having at least one locking pawl 52 in an engaged position secures the seat 20 in a fixed position in the event that the vehicle is suddenly stopped, accelerated or subject to an impact collision. Moreover, very slight movement (i.e., 1/2 A) of the seat in either direction from the position illustrated in FIG. 13 instantly causes a second locking pawl 52 to engage a second slot 57 to provide for maintaining the maintaining the seat 20 in a desired position.

The slots 112 on the lower track 30 are preferably indexed in relationship to the spacing of the slots 57. This is to ensure that the pin 94 engages a slot 112 only under the conditions where the locking device is completely engaged to the lower track 30 (i.e., when two locking pawls are engaged into two of the slots 57).

The preceding description is exemplary rather than limiting in nature. Variations and modifications to the disclosed embodiment will become apparent to those skilled in the art that do not necessarily depart from the purview and spirit of this invention. Accordingly, the legal scope of protection for this invention can only be determined by studying the following claims.

What is claimed is:

1. An assembly for mounting a seat within a vehicle, comprising:
    a first track having a side wall including a plurality of spaced slots through said side wall, said slots each having a first operative dimension and being spaced apart by a first distance;
    a second track in moveable mating engagement with said first track;
    a plurality of locking pawls each having a second operative dimension and being supported on said second track for movement between a first position where said pawls are adapted to be received within one or more of said slots such that said second track does not move relative to said first track and a second position where said second track is free to move, said locking pawls being spaced apart by a second distance that is not equal to said first distance; and wherein
    a preselected ratio exists between said second dimension and each of said first dimension, said first distance and said second distance, respectively, such that said first operative dimension is twice said second dimension, said second distance is three times said second operative dimension and said first distance is equal to said first dimension and at least one of said locking pawls is partially received within at least one of said slots whenever said locking pawls are in said first position.

2. The assembly of claim 1, further comprising a release member and a handle member operatively coupled with said release member such that selected movement of said handle causes said release member to effect movement of said locking pawls between said first and second positions.

3. The assembly of claim 2, further comprising a third track having a side wall including a plurality of spaced slots through said side wall, said slots each having said first operative dimension and being spaced apart by said first distance;
    a fourth track in moveable mating engagement with said third track;
    a second plurality of locking pawls each having said second operative dimension and being supported on said fourth track for movement between a locking position where said pawls are adapted to be received within one or more of said slots on said third track such that said fourth track does not move relative to said third track and a released position where said fourth track is free to move, said second plurality of locking pawls being spaced apart by said second distance; and
    wherein at least one of said second plurality of locking pawls is partially received within at least one of said slots in said third track whenever said locking pawls are in said locking position.

4. The assembly of claim 3, further comprising a connector member operatively connecting said release member and said second plurality of locking pawls such that said selected movement of said handle member effects movement of said second plurality of locking pawls between said locking and released positions.

5. The assembly of claim 2, further comprising a biasing member that biases said locking pawls into said first position and a lock release bracket that moves said pawls against said bias of said biasing member responsive to movement of said release member.

6. The assembly of claim 5, further comprising a position indicator indexed to said first track to indicate a desired position of said second track relative to said first track, said release member causing said position indicator to be moved with said second track upon said selected movement of said handle member followed by selected movement of said second track relative to said first track.

7. The assembly of claim 6, further comprising a second release member that is operative to engage said lock release bracket and move said locking pawls into said second position while said position indicator remains indexed to said first track such that said second track can be moved relative to said first track and said position indicator and wherein said position indicator is operative to disengage said second release member from said lock release bracket upon contact between said position indicator and said second release member.

8. The assembly of claim 1, further comprising a position indicator member that is indexed to said first track to indicate a desired position of said second track relative to said first track.

9. The assembly of claim 8, wherein said position indicator includes a housing having a first portion and a second portion, a lever member, an index member and a biasing member urging said index member into engagement with said first track, said lever member being moveably supported by said first portion of said housing and said index member being supported by said second portion of said housing, said lever member selectively moving said index member against said bias to disengage said index member from said first track such that said position indicator is free to move with said second track relative to said first track.

10. The assembly of claim 1, further comprising:
    a position indicator that selectively remains in a fixed position relative to said first track and indicates a desired position of said second track relative to said first track when said second track is not in said desired position; and
    a release member that selectively moves into a release position to move said locking pawls out of said first position and maintain said locking pawls in said second position such that said second track can move in a first direction away from said desired position and wherein said position indicator includes an engaging portion that engages a portion of said release member as said second track is moved in a second direction toward said desired position such that said release member is moved out of said release position and said locking pawls return to said first position when said second track returns to said desired position.

11. The assembly of claim 10, wherein said position indicator includes an index member, said first track includes a plurality of receiver portions adapted to receive said index member and wherein said index member maintains said position indicator in said fixed position relative to said first track when said index member is received within one of said receiver portions.

12. The assembly of claim 11, wherein said position indicator includes a biasing member that urges said index member toward said first track.

13. The assembly of claim 12, wherein said index member comprises a pin and said receiver portions comprise slots in said first track.

14. The assembly of claim 11, wherein said position indicator further includes a lever member pivotally supported for selective pivotal movement that urges said index member away from said receiver portions.

15. The assembly of claim 11, further comprising a second release member that is operative to move said locking pawls into said second position and to urge said index member away from said receiver portions into a position where said position indicator is indexed to said second track such that said position indicator moves with said second track relative to said first track.

16. The assembly of claim 10, further comprising a seat base supported on said second track for movement with said second track, a seat back portion supported for pivotable movement relative to said seat base and wherein said seat back portion is operatively coupled to said release member such that selective pivotal movement of said seat back portion relative to said seat base causes said release member to move said locking pawls into said second position.

* * * * *